US006228169B1

(12) United States Patent
Wallace

(10) Patent No.: US 6,228,169 B1
(45) Date of Patent: May 8, 2001

(54) METHOD AND APPARATUS FOR APPLICATION OF 360° COATINGS TO ARTICLES

(75) Inventor: John S. Wallace, Bloomfield, MI (US)

(73) Assignee: ND Industries, Inc., Clawson, MI (US)

( * ) Notice: Subject to any disclaimer, the term of this patent is extended or adjusted under 35 U.S.C. 154(b) by 0 days.

(21) Appl. No.: 09/313,365

(22) Filed: May 18, 1999

(51) Int. Cl.[7] ................................ B05B 7/00; B05C 5/00; F16B 37/16

(52) U.S. Cl. .......................... 118/308; 118/300; 411/436; 411/903; 411/908

(58) Field of Search ..................................... 118/300, 308; 411/302, 303, 304, 902, 903, 908, 436

(56) References Cited

U.S. PATENT DOCUMENTS

| | | | |
|---|---|---|---|
| 3,830,902 | | 8/1974 | Barnes . |
| 4,100,882 | * | 7/1978 | Duffy et al. . |
| 4,262,038 | * | 4/1981 | Wallace . |
| 4,279,943 | * | 7/1981 | Wallace . |
| 4,366,190 | * | 12/1982 | Rodden et al. . |
| 4,775,555 | * | 10/1988 | Duffy . |
| 4,835,819 | * | 6/1989 | Duffy et al. . |
| 4,865,881 | * | 9/1989 | Sessa et al. . |
| 4,888,214 | * | 12/1989 | Duffy et al. . |
| 4,891,244 | * | 1/1990 | Wallace . |
| 5,090,355 | * | 2/1992 | DiMaro et al. . |
| 5,221,170 | * | 6/1993 | Duffy et al. . |

* cited by examiner

*Primary Examiner*—Neill Wilson
(74) *Attorney, Agent, or Firm*—Liniak, Berenato, Longacre & White, LLC

(57) ABSTRACT

A method and apparatus for applying coatings to a portion of the internal bore or threads of a fastener or similar article having an opening on at least one end is provided. A 360° coating with material is provided using centrifugal force to assist in direction the material to a desired surface, which does not require use of a pressurized air stream in order to propell the coating material toward the walls of the article desired to be coated.

22 Claims, 15 Drawing Sheets

| Part # | First On (in/lbs) |
|---|---|
| 1 | 60 |
| 2 | 60 |
| 3 | 70 |
| 4 | 60 |
| 5 | 50 |
| 6 | 60 |
| 7 | 60 |
| 8 | 75 |
| 9 | 60 |
| 10 | 75 |
| 11 | 75 |
| 12 | 50 |
| 13 | 75 |
| 14 | 60 |
| 15 | 75 |
| 16 | 65 |
| 17 | 60 |
| 18 | 75 |
| 19 | 75 |
| 20 | 50 |

| Part # | First On (in/lbs) |
|---|---|
| 1 | 25 |
| 2 | 25 |
| 3 | 25 |
| 4 | 30 |
| 5 | 20 |
| 6 | 25 |
| 7 | 20 |
| 8 | 25 |
| 9 | 20 |
| 10 | 20 |
| 11 | 20 |
| 12 | 10 |
| 13 | 20 |
| 14 | 25 |
| 15 | 25 |
| 16 | 20 |
| 17 | 20 |
| 18 | 25 |
| 19 | 25 |
| 20 | 20 |

METHOD AND APPARATUS FOR APPLICATION OF 360° COATINGS TO ARTICLES

BACKGROUND OF THE INVENTION

This invention relates generally to a method and apparatus for applying coatings to fasteners having internal bores. More particularly, the present invention relates to a method and apparatus for applying powdered coating materials to portions of the internal bore of a fastener or similar article that is open at at least one end, primarily utilizing centrifugal force, rather than an airstream to propel the coating material towards the surface of the fastener in order to form a 360° coating thereon.

Various methods and apparatus have been disclosed in the prior art for applying powder coatings to articles such as fasteners. Most of these efforts have been directed towards the application of coatings to fasteners having an external threaded surface. Since the threads of the fastener desired to be coated are in such instances are completely exposed, they do not pose the increased difficulty that is present when it is desired to provide coatings on fasteners or threaded articles that have internal bores or threads. The existing solutions to providing a 360° coating on the internal threads or an internal bore of a fastener have to date been cumbersome and inefficient, resulting in inconsistencies and increased production costs. In most of these prior devices, the internally threaded fasteners to be coated are first heated and then a nozzle is inserted into the threaded opening, which delivers powder particles entrained in an airstream which fuse and coalesce they contact the heated fastener threads. Typical of such systems is the apparatus disclosed in U.S. Pat. No. 4,835,819. In that device, a significant air pressure is required to be induced through a network of spider-like tubes and ultimately issuing through small nozzles at the end of the tubes directing coating material toward the threads of the fastener. The generating of an airstream under significant pressure required by such systems is both costly and difficult to regulate. Having to split the generated airstream equally into multiple tubes likewise adds problems. This is particularly true given the small sized diameters of the tube and openings of the nozzle when small internally threaded articles are being processed. The device also requires the powder to change direction multiple times during its travel in the airstream through the tube and the nozzle. Again, given the dimensions, these systems have been susceptible to regular clogging of tubes or nozzles, as well as inconsistent powder flow. The force generated by the airstream against the inner walls of the fastener is significant and requires the entire outer surface of the fastener to be surrounded by a fixture in order to prevent horizontal movement at the fastener during processing due to this force.

Several other types of methods and apparatus for forming 360° coatings on internal bores or threads of fasteners have also traditionally been utilized. For example, U.S. Pat. No. 4,865,881 discloses an apparatus and process for making locking slide nuts. In this device, a fastener opening is filled with locking material in an amount significantly greater than the amount required to form the coating on the threads. A non-rotating clearance pin is inserted into the opening to attempt to direct the material towards the area of the fastener adopted for internal threading prior to heating and remains in that position while the fastener is heated and the coating material hopefully adheres to the inner walls of the fastener. The clearance pin may then have to be used selectively to clear a passage way through the locking material, either before or after the heating step. In this device, although the clearance pin serves to deflect some of the powder towards the walls of the internal opening of the fastener, it does so with insufficient force to maintain a significant amount of that powder against the walls. In addition, any vertical motion of the clearance pin after the coating has been formed can easily dislodge the entire coating from the desired area of the internal opening of the fastener.

U.S. Pat. No. 4,891,244 describes a method and apparatus for making self-locking fasteners utilizing a mechanical propelling device which comprises a rotatable slinger. The slinger propels particles by centrifugal force against heated threaded surfaces of fasteners. This device, however, only contemplates the coating of threaded fasteners over a circumference of 180° or less. This system further requires that the powder be fed to and confined in four small diameter tubes at different vertical heights that are spaced circumferentially every 90° along the disc in order to be discharged toward the fastener surfaces. The facetless surface requires the disc to be a large diameter, in order to accelerate the powder particles to a velocity which will spray horizontally over the significant distance from the slinger to the bolt surface. The increased velocity imparted to the powder particles causes the vast majority of powder to bypass or bounce off the fastener. This has contributed to inconsistent powder flow and coating results.

In addition to the shortcomings set forth above with respect to the prior art devices, none of these devices had the ability to apply two different powdered coating materials to a single fastener during the coating process. Prior known systems also fed significantly more powdered coating material toward the threads than ultimately ended up coalescing and forming the coating. This increased the frequency of powder flow problems when this excess powder was collected and ultimately recirculated. It is apparent, therefore, that there is a need to be able to form 360° coatings on articles such as fasteners that have internal bores open at at least one end or threads, without the necessity of entraining the powdered coating material in a pressurized airstream.

SUMMARY OF THE INVENTION

The present invention overcomes the deficiencies of the prior art by providing a method and apparatus for applying 360° coatings to the internal bore or threads of a fastener or similar article, in a consistent manner without requiring the use of an airstream to direct the powder towards the bore or threads.

It is an object of the present invention to provide a method and apparatus for applying 360° coatings to the internal bore or threads of a fastener or similar article that does not require the coating material to issue from a tube when it is directed to the area desired to be coated.

It is therefore an object of the present invention to provide a method and apparatus that accomplishes the above result in a consistent, effective and cost efficient manner.

It is another object of the present invention to provide a method and apparatus for applying 360° coatings to the internal bore or threads of a fastener or similar article that permits a faster speed of production of such fasteners or articles than prior known devices.

It is still another object of the present invention to provide a method and apparatus for applying 360° coatings to the internal bore or threads of a fastener or similar article that provides an inspection and/or removal station on the device itself to remove any coated articles that may be rejected.

It is still a further object of the present invention to provide a method and apparatus capable of applying 360° coatings of powdered materials to the internal bore or threads of a fastener or similar article utilizing a lower particle velocity and lower heating temperatures.

It is yet another object of the present invention to provide a method and apparatus for applying 360° coatings to the internal bore or threads of a fastener or similar article that is capable of providing coatings of two or more different types of materials on the same fastener during one cycle of the device.

It is still a further object of the present invention to provide a method and apparatus for applying 360° coatings to the internal bore or threads of a fastener or similar article that provides a continuous simultaneous stream of coating material directed towards the entire 360° surface of the article over an extended period of time.

It is yet another object of the present invention to provide a method and apparatus for applying 360° coatings to the internal bore or threads of a fastener or similar article with stations to clean and/or oil the device during each rotation of the device.

It is still another object of the present invention to provide a method and apparatus for making coatings on fasteners having an internal bore open at at least one end, wherein virtually all of the coating material fed to the fastener ends up on the fastener and does not need to be recirculated.

These and other objects are satisfied by a method and apparatus for making coatings on fasteners having an internal bore open at at least one end, wherein the coating material is delivered without requiring the use of an airstream and forms a 360° coating thereon at a predetermined desired location.

BRIEF DESCRIPTION OF THE DRAWINGS

The novel features which are characteristic of the present invention are set forth in the appended claims. The invention itself, however, along with its objects and intended advantages will best be understood by reference to the following detailed description, taken in connection with the accompanied drawings, in which;

DETAILED DESCRIPTION OF THE INVENTION

Figure 3:
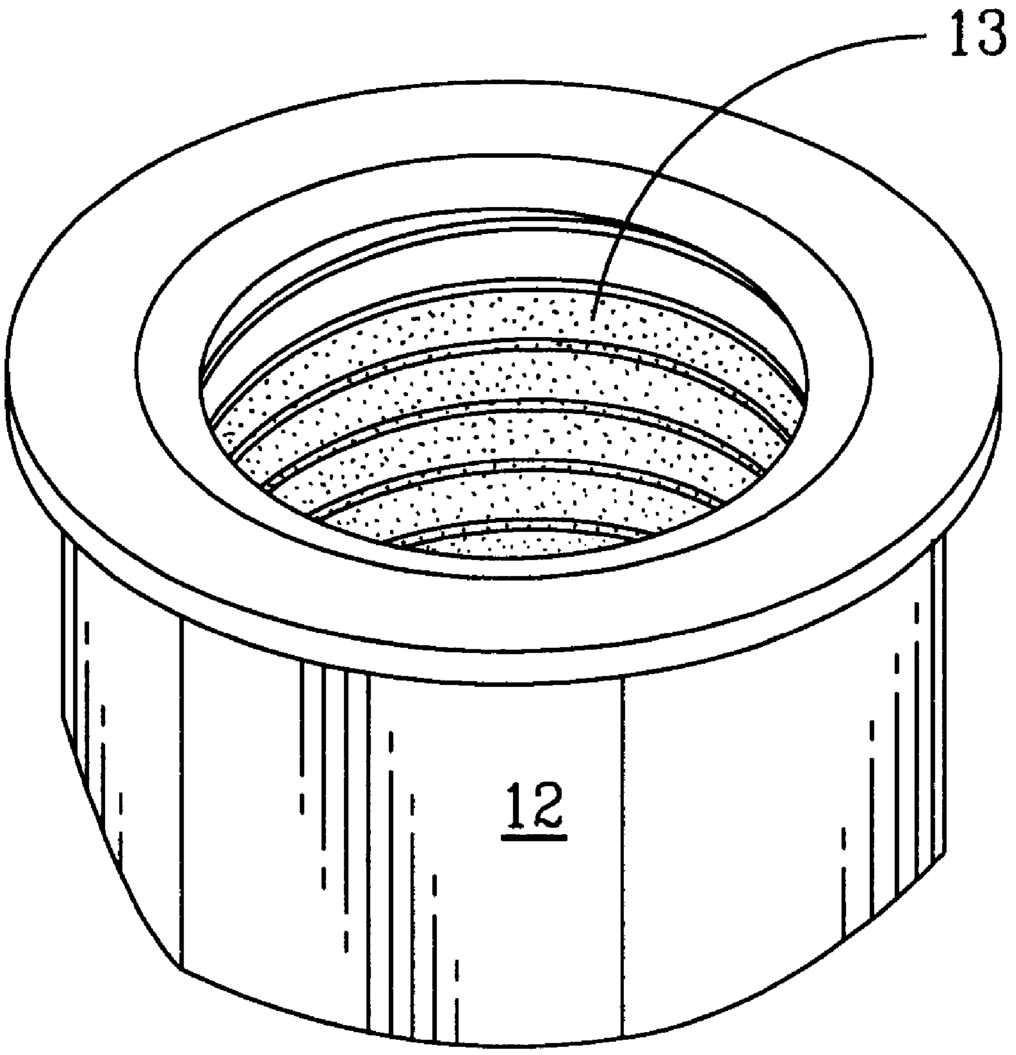
FIG. 3 is a perspective view of a typical internally threaded fastener containing a coating of self-locking material applied using the present invention.

Referring now to the drawings and in particular FIG. 3, a typical internally threaded fastener is illustrated that has had a 360° coating 13 of fused powdered material, a nylon patch, deposited thereon in accordance with the present invention. A nylon patch is illustrated as exemplary of only one of the many different types of coatings that can be achieved in connection with the use of the method and apparatus of the present invention. It should be noted that the present invention can be beneficially used to deposit all manner of fine powdered materials onto a variety of different articles. Coating materials deposited by the present invention can serve various purposes including, but not limited to, masking, insulating, lubricating, adhering and/or increasing the torsional resistance of the articles when mated.

A particularly preferred use of the present invention is to deposit thermoplastic type powdered materials such as nylon 11 or fluoropolymers onto a succession of discrete articles such as internally threaded fasteners, in order to give them self-locking and/or insulating characteristics. It should be understood that the present invention can be equally beneficially utilized in connection with a wide variety of other fasteners or articles having an internal bore that is open on at least one end. It is to be understood, therefore, although the invention will be described in detail to follow with respect to the application of powdered material onto the threads of an internally threaded fastener, that this terminology is intended to be non-limiting and is used as a shorthand for any metal article having an internal opening open on at least one end the applications and any type of powdered coating material in accordance with the present invention.

Figure 1:
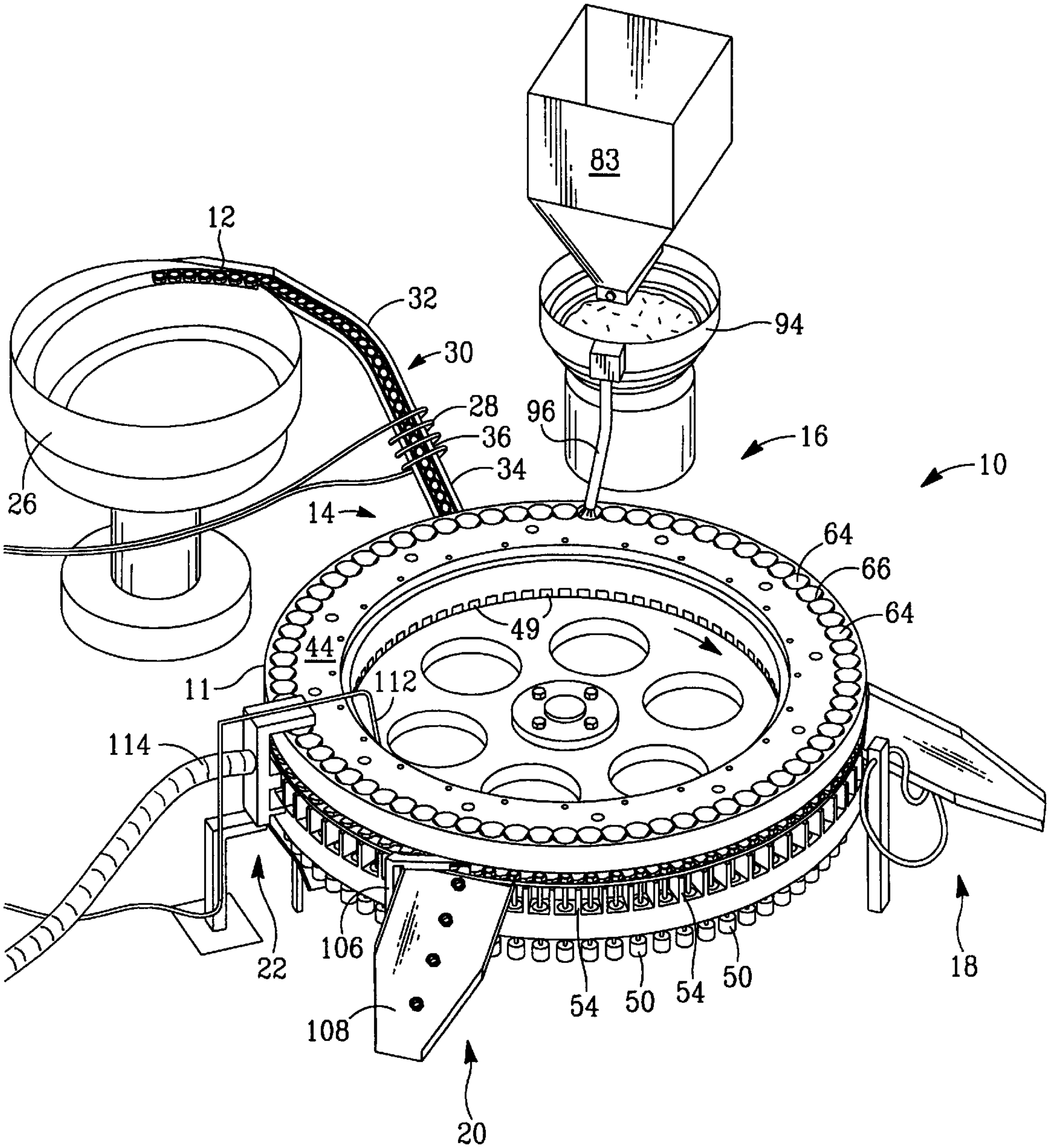
FIG. 1 is a perspective view of an embodiment of the apparatus of the present invention.
Figure 2:
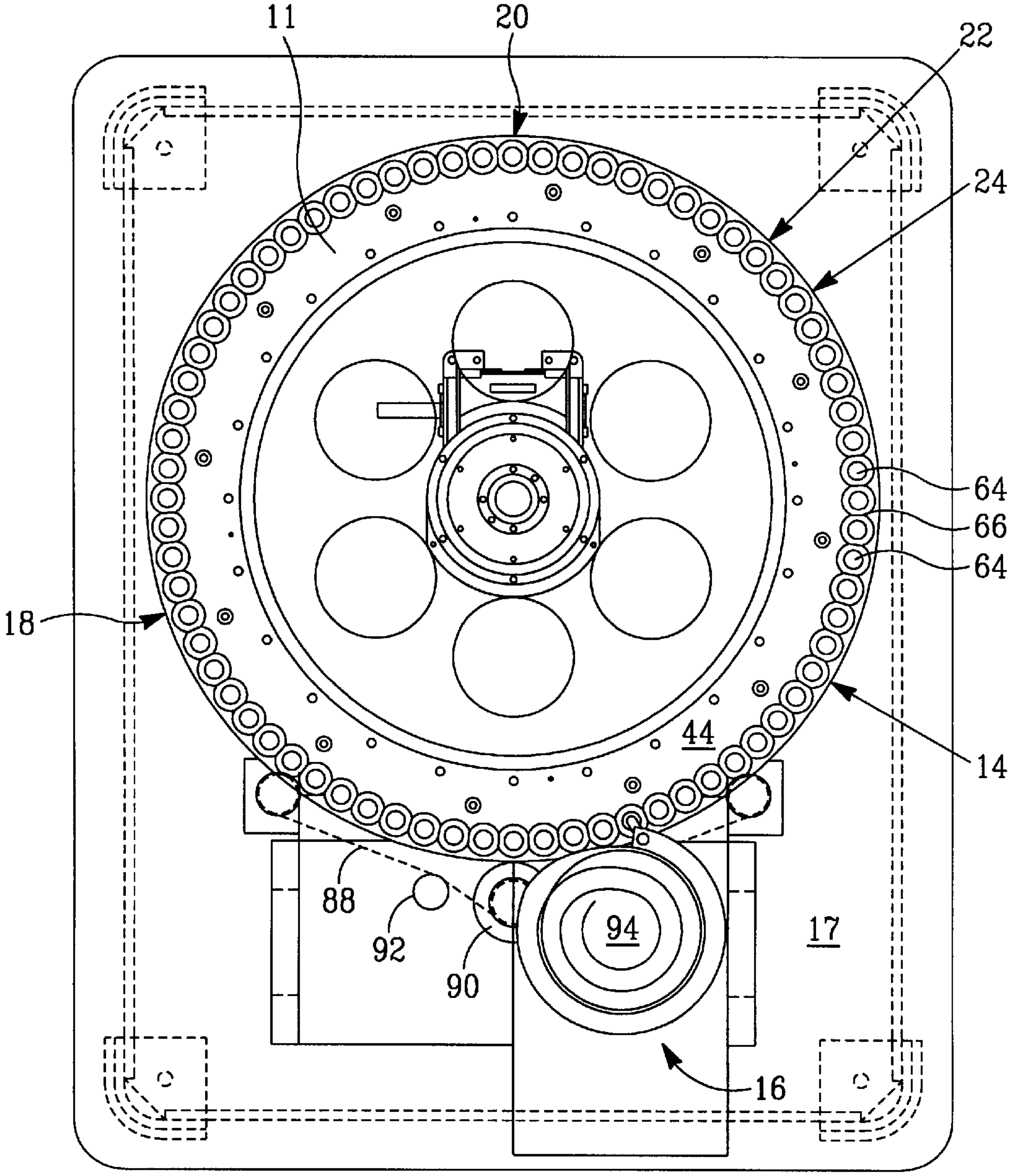
FIG. 2 is a diagrammatic top plan view of the apparatus show in FIG. 1.

Referring now to FIGS. 1 and 2, the apparatus of the present invention is generally disclosed. In its most preferred embodiments, the apparatus 10 includes a loading station 14, a material application station 16, a parts purging station 18, a parts removal station 20, a cleaning station 22 and a lubrication station 24 spaced circumferentially around a dial 11. In such embodiments, the fasteners 12 are preferably preheated and loaded onto the device at station 14. Thereafter, the dial 11 continues to rotate. Coating material is applied at station 16, the coated fasteners 12 next pass a purging station 18 where they can be inspected on the dial 11 and rejected fasteners can be simultaneously removed. The fasteners 12 continue to rotate on the dial 11 until they are removed at station 20. The dial 11 continues its rotation past the cleaning station 22, where any stray coating material is removed prior to the time apparatus 10 completes one complete revolution back to the loading station 14. A lubrication station 24 can be provided to lubricate the applicators 50 of the apparatus 10 without removing them or stopping the rotation of the dial 11, as will be described to follow.

Referring now to FIGS. 1, 2, 4, 5 and 6, the present invention will be described in more detail. In the preferred embodiment, fasteners 12 are first arranged prior to being introduced on top of the dial 11 so that their openings are similarly oriented and the edges of successive fasteners 12 are in contact with one another using a vibratory bowl 26 or similar known device. The fasteners 12 exit the bowl 26 onto a downtrack 30 which feeds the fastener 12 towards the dial 11. Along the length of the downtrack 30, the fasteners 12 can first be heated in any manner well-known to those of ordinary skill in the art. Although the fasteners could be heated while on the dial 11, heating them on the downtrack 30 is beneficial since it provides more space along the dial for other operations and further reduces heat exposure and buildup in the pins 72 and other parts of the apparatus 10. An induction heating coil 28 is preferably used to preheat the fasteners as they move along the downtrack 30. Power to the induction coil 30 is regulated to adjust the fastener temperature. This permits preheating of fasteners to different temperatures, depending upon the requirements of a particular situation, to fuse powdered coating materials to the fasteners.

Figure 5:
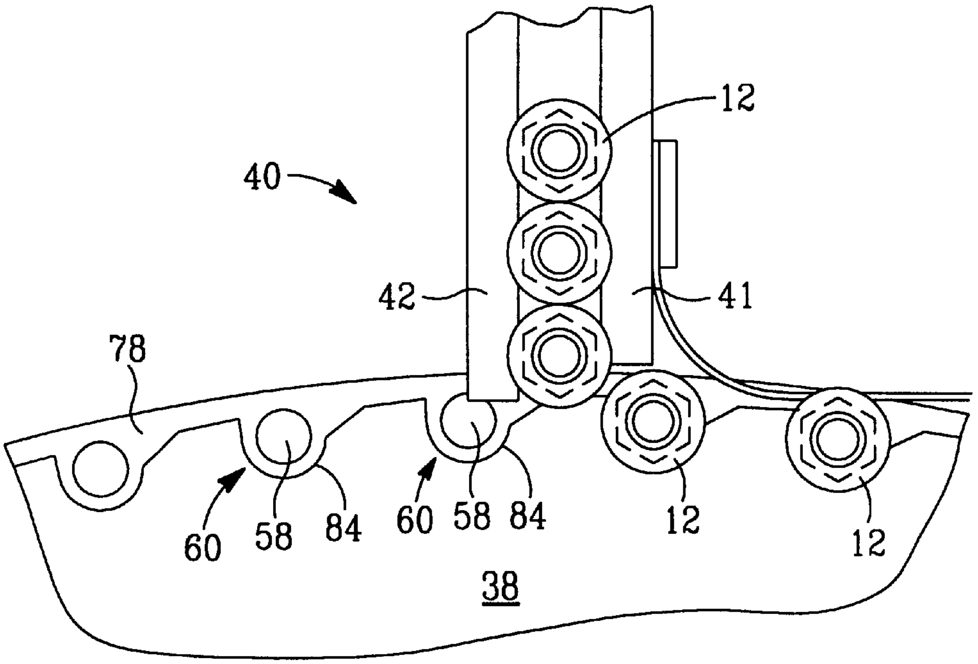
FIG. 5 is a partial top plan view of the loading station and nesting plate of the apparatus of the present invention.

The downtrack 30 has top and bottom sections 32 and 34 that are made of steel. These sections are connected to an intermediate section 36 made of non-ferris material, preferably a phenolic material. The phenolic section 36 is needed in the area of the track 30, around which the heating coil 28 is wound. This is because phenolics do not heat due to the electromagnetic field of the induction coil 28. The fasteners 12 are automatically supplied to the nesting plate 38 by the escapement 40. The escapement 40 can utilize either a cam and a spring or an optical sensor and a spring, in order to deliver a single fastener to each of the pockets 60 of the nesting plate 38 as they rotate pass the escapement 40. Alternatively, as illustrated in FIG. 5, escapement 40 can utilize the back pressure generated from the feeding of successive fasteners by the bowl 26 onto the track 30, the force of gravity acting upon the fasteners on the angled portion of the track and the configuration of the pockets 60 alone, to deliver a single fastener 12 into each of the pockets 60 of the plate 38. In this embodiment, the leading track 41 of the downtrack 30 terminates a short distance from the outer circumferential edge of the plate 38, while the trailing track 42 terminates a short distance from the point 31.

Figure 9:
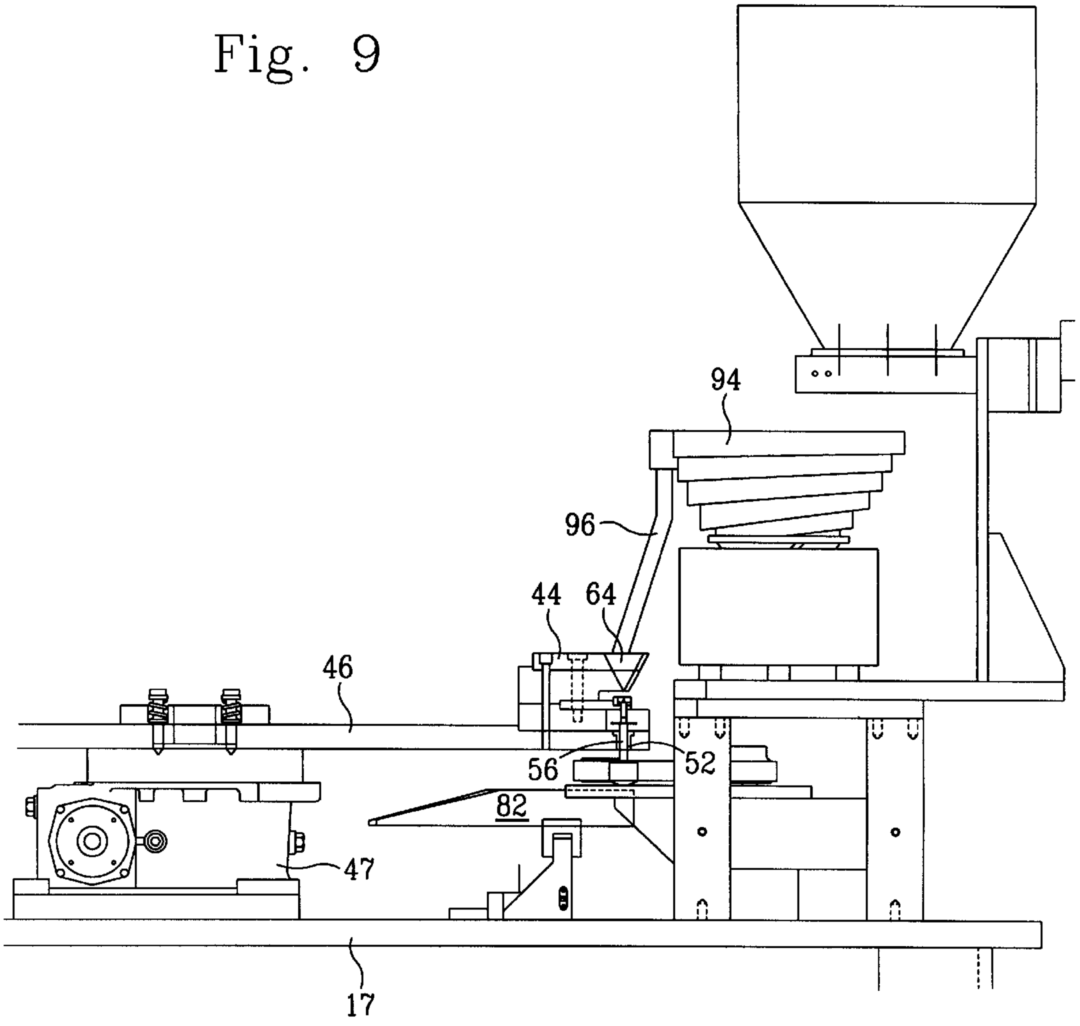
FIG. 9 is a partial cross-sectional view of the powder application station of the apparatus of the present invention.

The apparatus 10 features a dial 11 that includes plates 46, 38 and 44, respectively. The dial 11 preferably includes a base plate 46, that is secured to a variable speed motor 47 in a manner to permit rotational movement of the plate. The outer periphery of the plate 46 is provided with a series of equally spaced apertures 52. As can be particularly seen in FIGS. 1, 6 and 9, for example, each of the apertures 52 includes a bushing 56. Each bushing 56 in turn accommodates and permits a material applicator 50 to both rotate 360° and move vertically to a limited extent. The base plate 46 further provides walls 54 on either side of the upper portion of each aperture 52. In certain preferred embodiments the area between the walls 54 around each aperture 52 is also closed off from the interior of the plate 46. The walls 54 may optionally also define a series of equally spaced slots 49 facing the center of the dial. The nesting plate 38 is connected to the base plate 46 and its outer edge rests on a portion of the walls 54 of the plate 46. The nesting plate 38 has holes 58 equally spaced about its periphery. Each hole 58 is aligned 18 with an aperture 52 of the base plate 46. Each of the holes 58 is dimensioned so as to enable the upper portion of a material applicator 50 to be passed therethrough without contacting the sides of the hole 58. A pocket 60 is located around the inner portion of each of the holes 58 of the nesting plate 38.

Although, the pockets 60 can take on a variety of configurations or geometries, a preferred design for nesting and accommodating internally threaded fasteners, such as nuts with flat outer sides, is illustrated in FIG. 5. These semi-circular scallop-shaped pockets 60 allow a nut to be slid therein without requiring any further orientation. The radius of the semi-circular pockets 60 keeps the center of the fasteners in line with the axis of both the holes 58 and the applicators 50. Each pocket 60 further, preferably, contains an angled edge 62 which further assists in removing the fasteners 12 from the plate 38 once they have been coated, as will be described in more detail below.

Figure 4:
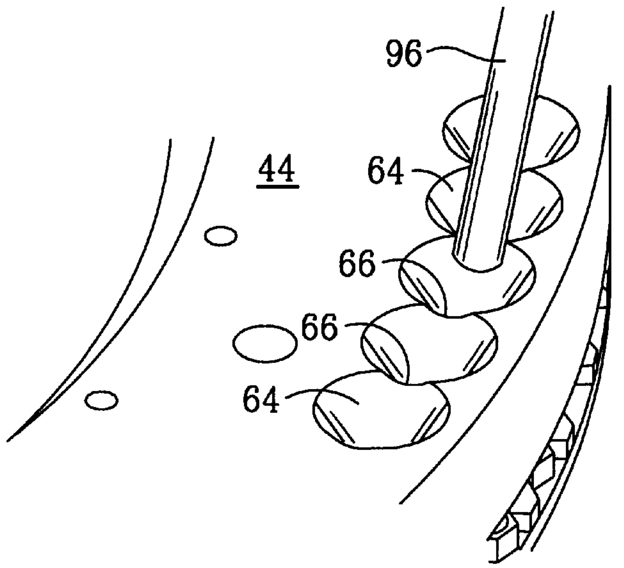
FIG. 4 is an enlarged view of the material delivery portion of the apparatus.

The funnel plate 44 is located above the nesting plate 38 and is connected to the base plate 46 so that it rotates at the same speed as the plates 46 and 38. The plate 44 includes a plurality of funnel-shaped cavities 64 spaced evenly about its outer periphery. As can be seen with reference to FIGS. 1 and 4, the cavities 64 are evenly spaced against one another with a substantial amount of overlap. This permits a continuous flow of powdered coating material to be deposited into successive cavities 64 as the plate 44 rotates past the application station 16 without creating dead spots or depositing coating material anywhere other than into the cavities 64. As a further aid to this desired result, as illustrated in FIG. 4, the center of the wall 66 between successive cavities is preferably shorter than the remainder of the upper wall of each cavity 64. The cavities 64, accept coating material that is directed downward from the application station 16.

The material exits the cavities 64 through a discharge hole 68 in the bottom of the cavity under the force of gravity. The exact geometry of the cavity shape is influenced by several factors. It is generally desirable to have the fasteners 12 nest as close together on the plate 38 as possible to allow for a smooth flow of fasteners 12 from the downtrack 30 and also to maximize the number of fasteners that can be processed at a given dial speed. It is widely understood in the industry that wall angles that are at least about 60° from horizontal are beneficial for efficient gravity flow of powders from funnels or cones. A value above 60° is in many cases even more preferred. The tighter the fasteners are nested on the plate 38, however, the higher potentially the angles of the cavity 64 are. Higher cavity angles result in a smaller target for coating material to fall into for a shorter exposure period at a given dial rotation speed. If the cavity wall angles greater than 60° are used, then the powder output can be spread continuously over a greater length of the cavities in the path as it rotates, as will be described in detail to follow.

The size of the discharge hole 68 of each cavity 64 is also important. To a large extent, the smaller the discharge hole, the more precisely the stream of powder passing through the cavity 64 can be directed at the absolute center of the spinning pin 70 beneath, resulting in the most consistent centrifugal flinging of powder. The goal is to use an efficient size discharge hole 68 to assure that the powder being dropped into the cavity 64 does not back up above the discharge hole 68, but instead flushes instantly through the hole. In this manner, the cavity 64 is not intended to be storage device which is filled and then empties over time. If this were the case, then common flow problems exhibited in prior known devices due to powder moisture and powder packing, for example, would be introduced resulting in inconsistent powder flow and coating results. The preferred method of operation, therefore, is to gradually meter powder into the cavity 64 with a discharge hole 68 which is big enough to allow the powder to rapidly exit, yet small enough to confine the stream to the center of the pin 70 as it drops from the hole. It has been found, for example, that when utilizing the present invention to produce 360° nylon self-locking patches on M-10 nuts, the exit hole is preferably about 0.076 inches. When the same coatings were placed on M-20 nuts, the diameter of the discharge hole is preferably about 0.100 inches.

As previously described, there is an applicator 50 associated with each of the cavities 64. Each of the cavities 64 is designed to direct powdered coating material to an individual applicator 50. As indicated, for example, in FIGS. 5 and 6, applicator 50 has a shaft 72 with a knob 74 at the lower end of the shaft and a pin 70 at the upper end of the shaft. The shaft 72 is journaled in a bushing 56 which permits both linear and rotational movement of the shaft, as illustrated. A flange 76 is provided on the shaft 72 to both limit the downward travel of the pin 70 and to assist in keeping any stray powder material from entering into the bushing 56. Any of a number of widely-known bushings could be used, such as a standard bronze bushing. A particularly useful bushing has been found to be a bronze bushing made from a sintered material such as oil impregnated bronze. Since this bearing is self-lubricating, it prevents seizure if the bearing is ever covered by powder. One such bushing that exhibits these characteristics is commercially available under the trademark Oilite®, from Beemer Precision, Inc., of Ft. Washington, Pa. The knob 74 is intended to engage adjacent rotating drive belt 88 via friction and pressure which positively drives it to the desired rotational speed. The outer surface of the knob 74 is preferably knurled to increase friction between the drive belt and the knob 74. The knob 74 could have a diameter that is as small as that of the pin shaft 72 if the pockets are tightly spaced together along the plate 38. In most preferred embodiments, however, the knobs 74 have a diameter greater than that of the pin shaft 72, in order to allow for the creation of more drive torque.

Each knob 74 also features a raised end 80 designed to engage a cam plate 82 to raise and lower the applicator 50 in the bushing 56. The pin shaft 72 features a pin 70 at the end opposite the knob 74. It is the pins 70 which spin and fling the powdered coating material under centrifugal force toward the surfaces of the fastener 12 desired to be coated. The pins 70 are preferably made of solid steel shafting, with the flinging end being ground built or cut with facets flutes or ridges. As will be described in more detail to follow, both the speed of the revolution of the pin 70 and the articulation of the pin surfaces influence the direction and pattern of the material flung towards the fastener threads, making the patch applied thereto thinner or thicker. The diameter of the pin 70 is preferably about 65 to 85% of the internal diameter of the fastener being coated. Clearance must be allowed to compensate for any wobbling in the bushing 56 and pin shaft 72 relationship and the tolerance of the pockets 60 to the fasteners 12. Also, any powdered material which does not adhere itself to the inner walls of the fastener 12 after it has been centrifugally directed by applicator 50, must have a space to enable it to fall vertically downward under the force of gravity and, ultimately, be recovered. If desired, the recovered powder can be automatically recirculated to the hopper 83 using known vacuum collection systems. It should be understood that the pins 70 can be rotated in either a clockwise or counterclockwise direction with similar results.

Figure 6:
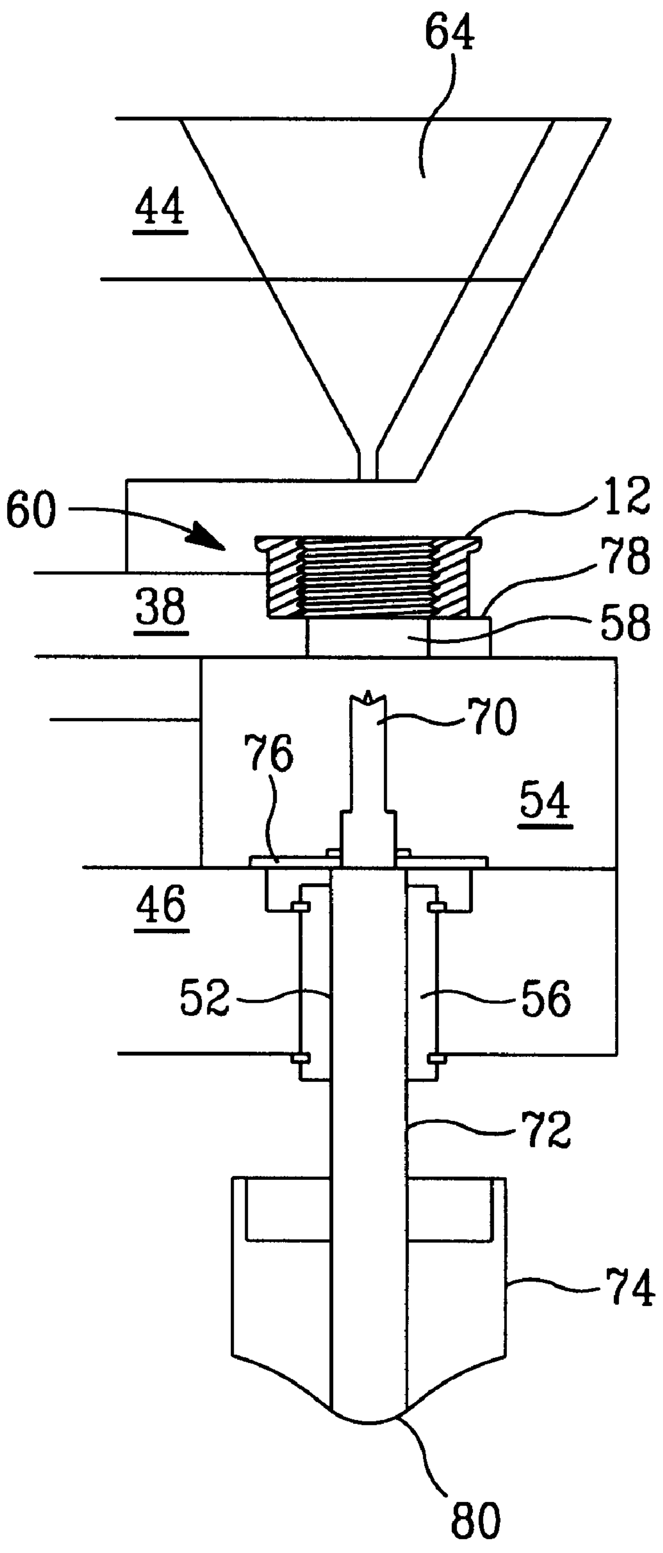
FIG. 6 is a diagrammatical cross-sectional view of the material application station of the present invention in its retracted position.

The length of the applicator 50 is important within certain broad parameters to the proper operation of the apparatus 10. At a minimum, when the applicator 50 is in its lowered or retracted position, as illustrated in FIG. 6, the top of the pin 70 must be below the floor 78 of the pocket 60 to allow the fastener 12 to be fed unimpeded on or off of the pocket 60 by a simple horizontal sliding motion. In most preferred embodiments, the applicator 50 is lowered so that the top of the pin 70 rests well below the bottom of the nesting plate 38. When it is not rotating and applying coating material, this provides an improved opportunity to cool the pin of any heat that has radiantly accumulated while the pin 70 was in its raised position inside a heated fasteners 12. This further facilitates cleaning of the pin 70 of any stray powder between applications of coating material using an air blast or a vacuum without having to remove the applicator 50 from the dial 11 as will later be described in detail. The applicator 50 also needs to be long enough to be raised by the cam plate 82 to the highest coating position required for particular fasteners to be processed by the apparatus 10. A barrel nut, for example, might need a patch at a much higher position off of the floor 78 of the pocket 60 than a standard nut. The unique features and details of the apparatus 10 will now be described by tracing the path of a fastener 12 processed with a 360° coating by the present invention.

Referring now to FIGS. 1, 2, 5 and 6, as the fasteners 12 pass through the previously described induction coil 28 and reach the escapement 40, they have usually been heated to a temperature above the softening point of the coating material that will subsequently be applied thereto. In the case of nylon 11 coating powder, for example, the fasteners 12 are usually heated to a temperature of about 350° to 400° F. As described in more detail below, the efficiency of the lower velocity simultaneous 360° application of powder has permitted the use of temperatures somewhat lower than prior known systems. The escapement 40 delivers a fastener 12 to each of the pockets 60 of the nesting plate 38 as they rotate past the escapement. The escapement 40 places a fastener 12 in the pocket 60 so that the internal opening of the fastener 12 is centered over the hole 58 of the nesting plate 38. In addition, the flat sides 13 of the fastener 12 engage a portion of the pocket wall 84 in order to ensure proper centering. As a result, fasteners can be fed onto the plate simply by sliding them into the pocket 60 without further orientation, since the radius of the pocket 60 keeps the fastener centered in line with the axis of the pin 70 below.

It is further important to note that the present invention does not require nesting of the fasteners with a static outer fence on all sides of the fastener or require that the pocket walls 84 precisely match the configuration of the sides of the fastener 12. In many prior systems, it was necessary to surround and contact the fastener very precisely on all sides in order to either rotate the fastener as coating material was applied, or to resist the force of powder applied from a nozzle that has a direction velocity which would otherwise cause the fastener to move. Since the applicators 50 of the present invention use centrifugal force, rather than a pressurized airstream, to deliver the powder particles towards the inner walls of the fastener, this is unnecessary in the present invention. In addition, the centrifugal application method of the present invention causes the particles themselves to be broadcast simultaneously in all directions creating a cancelling force around the entire 360° inner surface of the fastener. Furthermore in the present invention, the fasteners are maintained stationary during the entire material application process and do not require any sort of rotation.

Figure 7:
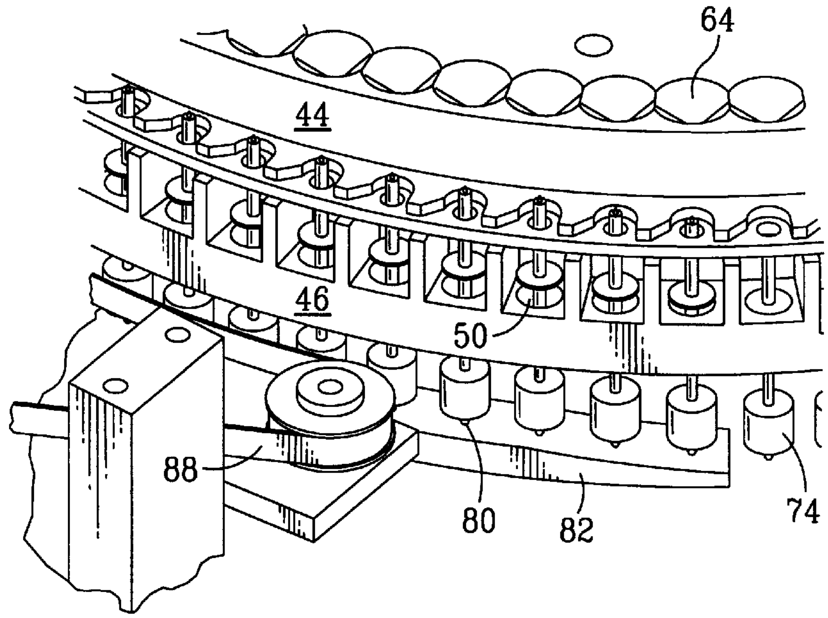
FIG. 7 is an enlarged view of the loading portion of the cam system of the apparatus of the present invention.
Figure 8:
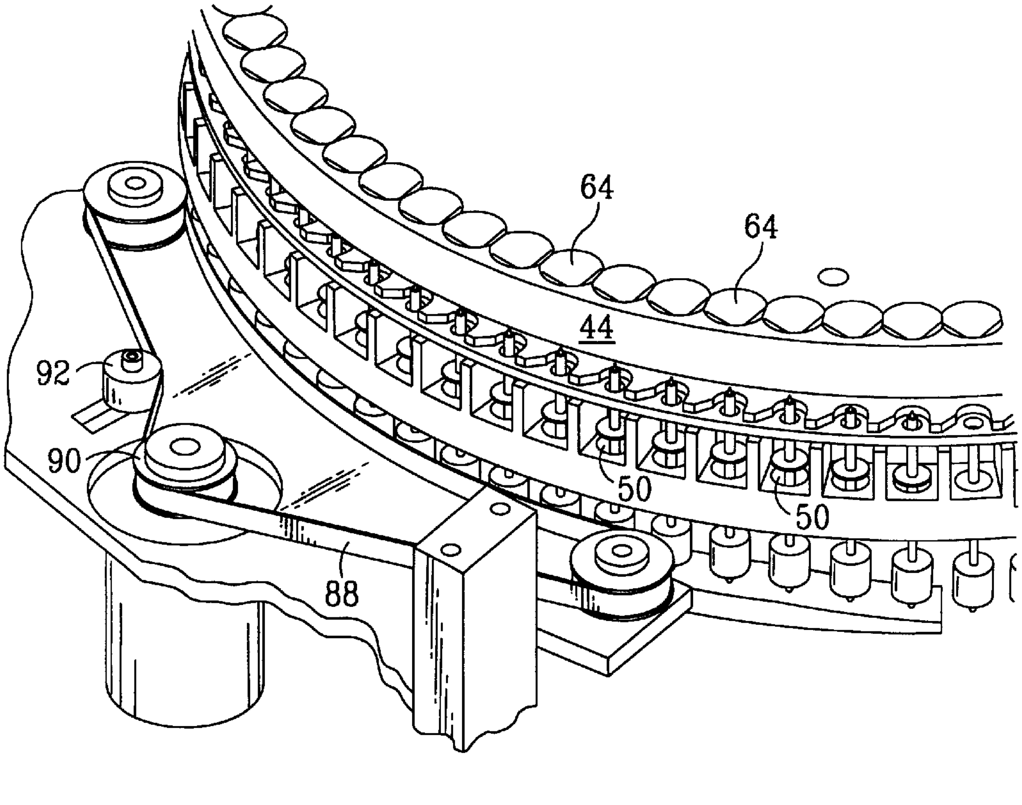
FIG. 8 is a side perspective view of the belt drive system of the apparatus of the present invention.

Once the fastener 12 is positioned in the pocket 60 with the dial 11 rotating, an optional centering device, such as a static bar 86 or a spring guide, may also be used to urge the fastener 12 into its pocket 60 to further insure that it is centered above the hole 58 in the nesting plate 38, as illustrated in FIG. 6, with the fasteners 12 nested in the pocket 60. At this point in time, the applicator is in its fully retracted, non-rotating position. As the dial 11 continues its rotation, the raised end 80 of each applicator 50 is brought into contact with the cam plate 82. As particularly illustrated in FIGS. 7 and 9, the cam plate 82 is angled so as to raise each applicator 50 vertically from its fully retracted position to its fully extended position, as the dial rotates. In its fully extended position, the top of the pin 70 is completely within the opening of the fastener and is vertically above the floor 78 of the pocket 60. The cam plate 82, therefore, serves to raise the pin 70 to the desired height inside the fastener 12 before the powder begins falling through its corresponding cavity 64. A variety of different designs can be utilized for the cam plate 82 depending upon the desired result. In the one preferred design, the cam plate 82 is a single piece of curved steel on which the ends 80 of the applicators 50 ride, with the plate 82 having two variable height adjustments, one at each end. Depending upon the desired result, the plate 82 can be adjusted to bring the pin 70 up, then hold it level, then ramp it down to the fully retracted position. Alternatively, the cam plate 82 could be tilted so that the pin 70 is continuously rising or falling as the end of the pin is in the fastener opening. In addition to the shape of the top end of the pin 70 having influence on the width of the 360° patch applied, any pin 70 which moves up or down while receiving powder also would tend to widen the patch.

Once the applicators 50 in their fully extended position, they then must be rotated prior to receiving any powder coating material from the cavity 64. The rotation of the dial 11 next causes the knobs 74 of the applicators 50 to engage a belt 88 along a defined length of their arcuate path. The belt 88 contacts and rotates several knobs 74 at a time. The belt is driven by a variable speed d/c motor at a speed of revolution set by remote digital meter. The belt tension is controlled by adjusting the position of an idler pulley 92. The belt 88 can be made of any material, such as a rubber compound, which exhibits sufficient frictional qualities against the knobs 74. It is preferred to use a timing style or toothed belt in order to provide a positive driving of the belt 88 by the motor without any slipping. The number of applicators 50 which have to be engaged by the belt 88 is directly related to how long it is desired to have the powder metering or application continue. For example, some parts requiring heavy wide patches may require a longer powder feeding time and, therefore, need a longer spinning distance. The construction of the present invention can provide a much longer spinning or applicating distance than are needed to get industry standard torque values on an M-10 nut. It will be understood by those of ordinary skill in the art that alternative pin spinning designs, such as a chain which engages two sprockets at the end of the knobs 74 could also be utilized.

As the dial 11 continues to rotate fasteners 12 next encounter the material application station 15. It is here that the coating material such as, for example, nylon powder is continuously fed to successive cavities 64 in a continuous pulse-free stream. Although a variety of different known powder feeding mechanisms could be utilized, a particularly preferred powder feeding mechanism is a vibratory bowl powder feeder 94, as more filly described in the U.S. Pat. No. 5,656,325, the disclosure of which is incorporated herein by reference. Use of such a feeding mechanism is known to produce a continuous, pulse-free, consistent flow of powder. The powdered material can be directed downward from the exit of the feeder 94 under the force of gravity by a tube 96 thereby delivering a concentrated stream of powder to the cavities 64. Alternatively, the discharge of the feeder 94 can be flowed out over a broader area through the use of articulated sheet metal.

Use of extended length nozzles (greater than 1 ½ inches) in the art to apply nylon powders to externally threaded fasteners has proven superior to the use of either a single short nozzle or multiple nozzles of the same small size. Such single or multiple short nozzles have had difficulty in delivering powder and effecting an adequate nylon patch when fasteners are passed at high speed. In the present invention, the limitation of the cavity of a small diameter can be overcome by continuously supplying powder to the cavity over a greater length of the path of each cavity. In this manner, powder would be metered to the spinning pin 70 for a longer period of time. In the present invention, multiple discrete streams from one bowl feeder or multiple streams from multiple bowl feeder could be directed into a passing cavity 64, either with no delay between the streams or with a delay between subsequent streams to allow substantially complete melting of the first amount of powder applied between the application of the two streams. This also permits the possibility in the present invention of applying a binary coating composed of a base patch of material such as nylon followed by a top thin coating of a lubricant such as molybdenum or Teflon. The present invention uniquely allows for the application of multiple dissimilar materials to form a single coating in one pass of the dial 11.

Spreading the powder flow to each cavity 64 over a longer distance of its arcuate path also provides another potential benefit. As previously described , it is often desired to nest the fasteners 12 on the nesting plate 38 as tightly together as possible. Such nesting requires higher cavity wall angles resulting in a smaller target for powder to fall into the cavities 64 for a shorter exposure period at a given rotation speed. Applying the powder to the cavities 64 over a greater portion of the arcuate path of each cavity permits all of the benefits of tighter nesting of fasteners, higher cavity wall angles, and a longer period of time for powder to be fed into the cavities 64. This in turn, requires less dial velocity to achieve a given rate of production.

Figure 10A:
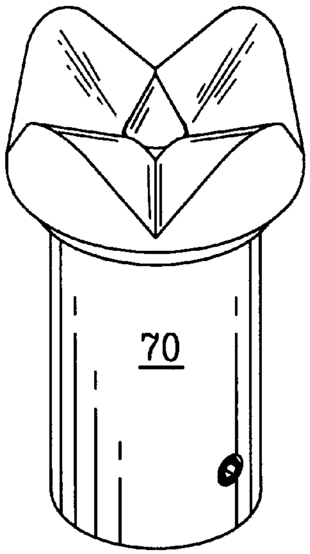
FIG. 10A is a perspective view of one embodiment of a pin used by the present invention.
Figure 10B:
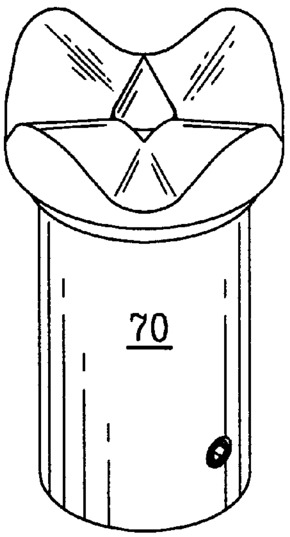
FIG. 10B is a perspective view of another alternative embodiment of a pin used by the present invention.
Figure 10C:
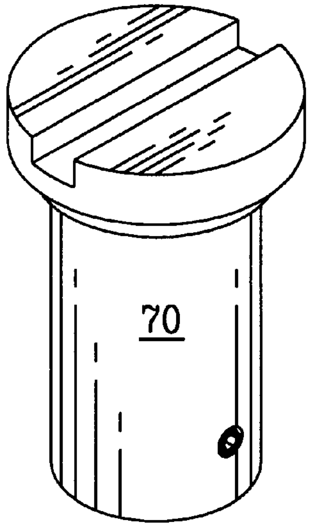
FIG. 10C is a perspective view of an alternative embodiment of a pin used by the present invention.
Figure 10D:
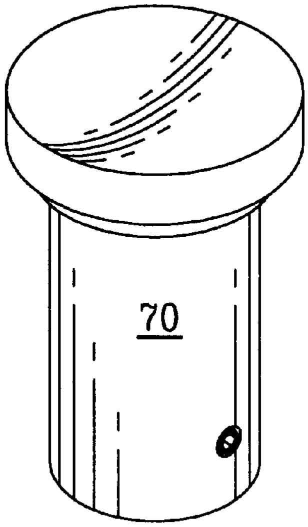
FIG. 10D is a perspective view of an alternative embodiment of a pin used by the present invention.

As the powder is applied to each cavity 64, it is directed through the discharge hole 68 in a continuous stream without backing up above the hole. The powder then empties from the hole 68 and is directed at the center of the spinning pin 70 which centrifugally flings the powder towards the internal threads of the heated fastener 12 to form a coating thereon. A wide variety of different pin shapes can be utilized. A particular preferred shape in forming 360° nylon coatings on a preselected number of the threads of internally threaded fastener has been found to be a pin with a four prong 45° faceted top with a center point as illustrated in FIG. 10A. Other exemplary preferred pin designs are illustrated in FIGS. 10B through D, respectively. The designs can include slots, sharp angled facets, points, rounded depressions or combinations thereof. Prior centrifugal devices for applying powdered material to the threads of fasteners utilized large diameter spinning discs without facets, that needed to accelerate the powder particles to a high velocity in order to permit the particles to travel horizontally over a significant distance to the surface of a bolt. The spinning pins of the present invention are compact in design and often utilize facets or similar shapes, in order to accelerate the particles toward the fastener. The distance from the pins and facets to the internal surface of the fastener is very small. As a result, a lower velocity is needed to propel the particles and fewer particles bounce off of the fastener surface, once they contact it. As a result of the use of the powder feed system of the present invention, less powder bypasses the fasteners during the application process and a smaller capacity vacuum is required to contain, collect or clean the machine of powder particles that do not adhere during the application process than prior systems.

Figure 11A:
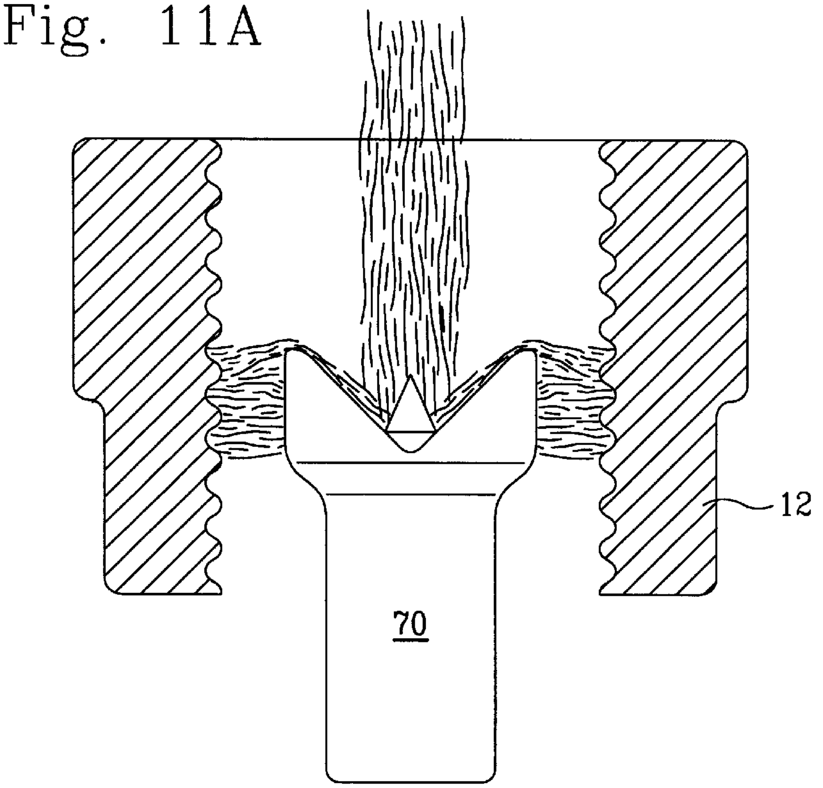
FIG. 11A is a partial cross-sectional view of the pin illustrated in FIG. 10A applying coating material to the threads of an internally threaded fastener in accordance with the apparatus of the present invention.
Figure 11B:
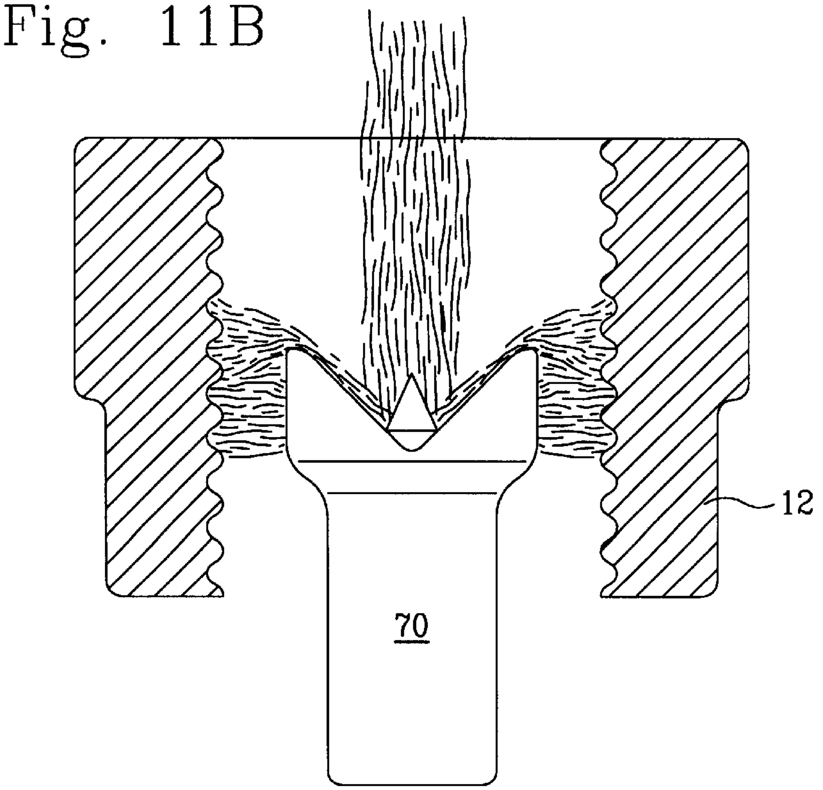
FIG. 11B is a partial cross-sectional view of the pin illustrated in FIG. 10A applying coating material to the threads of an internally threaded fastener at an increased rotational speed.

In addition, the simultaneous 360° flinging of powder creates a patch on the fastener faster than a spraying nozzle, which is directional. This too permits faster processing speeds and more efficiency, by applying powder around the entire 360° circumference at a given time after the fastener exits the heater. The speed of revolution of the pins 70 also seems to have an effect on the powder application. Preferred speeds for the pins, such as those illustrated in FIGS. 10A through 10D, usually range between about 1,000 to 2,000 rpms. FIGS. 11A and 11B illustrate what is believed to be the influence of one pin shape and two different speeds of revolution thereof on the ultimate patch formed. In general, the higher the speed of rotation of the pin 70, the wider the patch formed.

Figure 12:
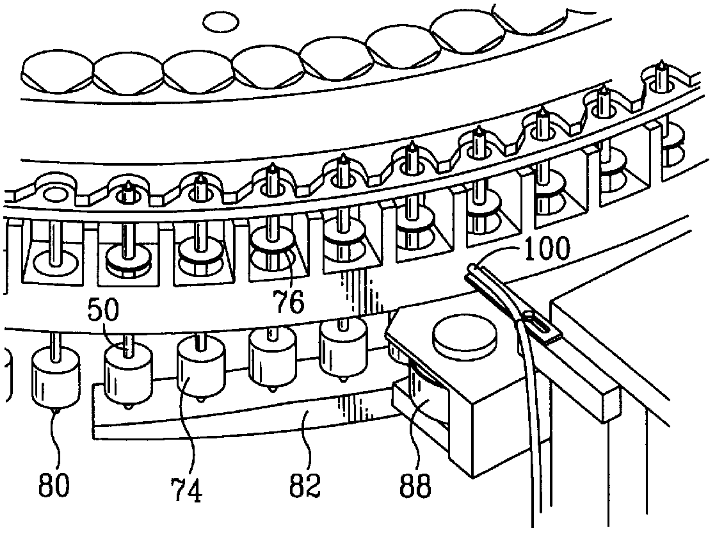
FIG. 12 is an enlarged side view of the trailing portion of the cam assembly of the apparatus of the present invention.
Figure 13:
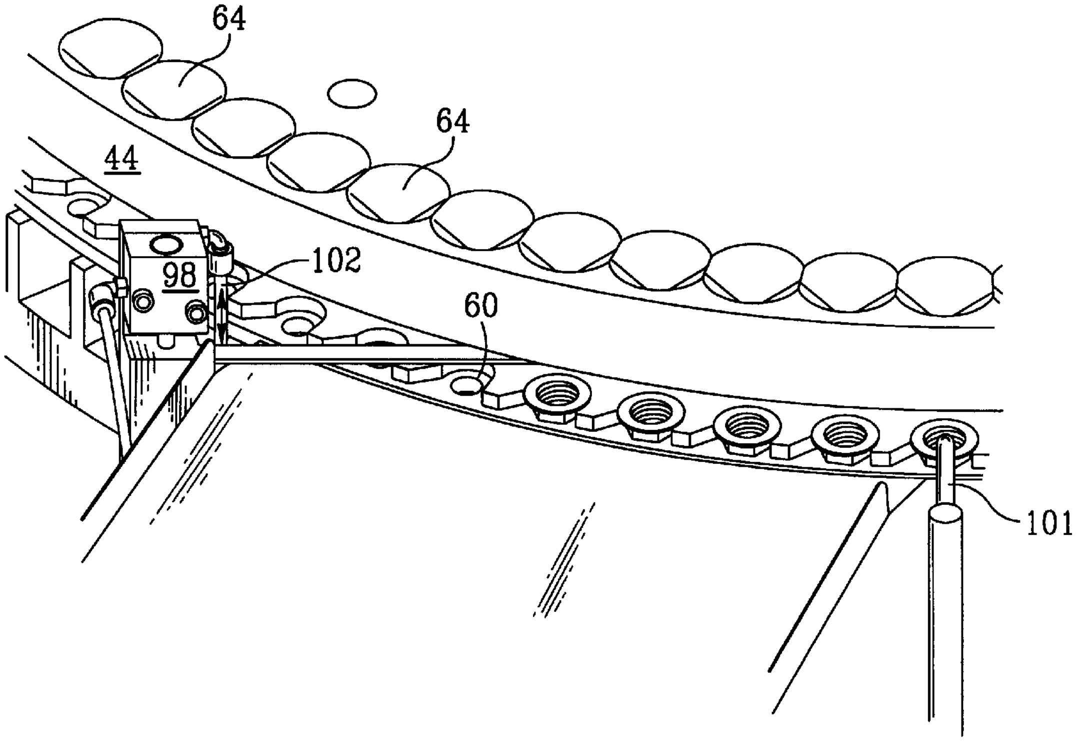
FIG. 13 is an enlarged side view of a parts ejector associated with the apparatus of the present invention.

Referring now to FIGS. 2, 12 and 13, as the dial 11 rotates to a position where powder is no longer being applied to a cavity 64, the knob 74 moves out of contact with the belt 88 and ceases its rotation. At the same time, the trailing end of the cam plate 82 angles downward causing to applicator 50 to lower to its fully retracted position where it is no longer in contact with the cam plate 82. As the dial continues to rotate the fasteners 12 with coating material now applied to their internal threads, next encounter the parts purging station 18.

There are scenarios in which poorly or incompletely processed parts might exit the processing and be intermixed with acceptable parts in a collection bin at the parts removal station 20. For example, to achieve even heating of the fasteners, they must all spend the same amount of time coming through the induction coil 28 on the downtrack 40. Further, each of the fasteners 12 must rotate between the loading station 14 and the material application station 16 in the same amount of time to further ensure that they are all the same temperature when powder or other coating material is applied thereto. Interruptions in feeding fasteners due to a failure or jamming in the downtrack 40 or the dial 11 or a malfunctioning induction heater can also potentially introduce heating inconsistencies. Additionally if the dial 11 is ever stopped, and then resumed, it is likely that the fasteners 12 already on the machine from the start of the induction coil 28 to the material application station 16 should be rejected. In order to accomplish this purpose, a logic controller 98 triggered by a signal from the loading station 14 and/or another source such as one or more optical sensors are used in combination. Every time the device 10 is started, the sensor 100 counts a preselected number of fasteners and sends a signal to the pneumatic actuators 102 to lower the purge gate 104 to remove these fasteners from the plate 38 for subsequent inspection. Additionally, in order to determine whether sufficient coating material or a patch is present on the predetermined inner surface of coated fasteners 12, an optical sensor such as sensor 101 can be used to inspect for the presence of a sufficient patch of coating material. If a sufficient patch is detected, then the gate 104 remains open, allowing the coated fasteners to continue on the dial 11 to the removal station 20. However, if the sensor 101 detects an insufficient patch present on the fasteners, a signal is sent to the pneumatic actuators 102 to lower the purge gate 104 to remove the fastener on which the insufficient patch was detected, as well as additional surrounding fasteners if desired. Although a variety of different commercially available devices can be utilized to accomplish the purposes of the purging station 18, it has been found that a SunX FX-7 fiberoptic sensor, manufactured by SunX Trading Company, Ltd., of Tokyo, Japan, a Keyence PZ101 photoelectric sensor manufactured by Keyence Corporation of Tokyo, Japan, and solid state timers, digital counters and photoelectric switches sold by Omron Corporation of Kyoto, Japan, under the Model Nos. H7CR, H3CA and E3A2 have performed effectively. When a reject start or restart condition is detected by the parts purging station 18, the gate 104 will be lowered to engage the required number of fasteners 12 forcing them off of the plate 38.

Figure 15:
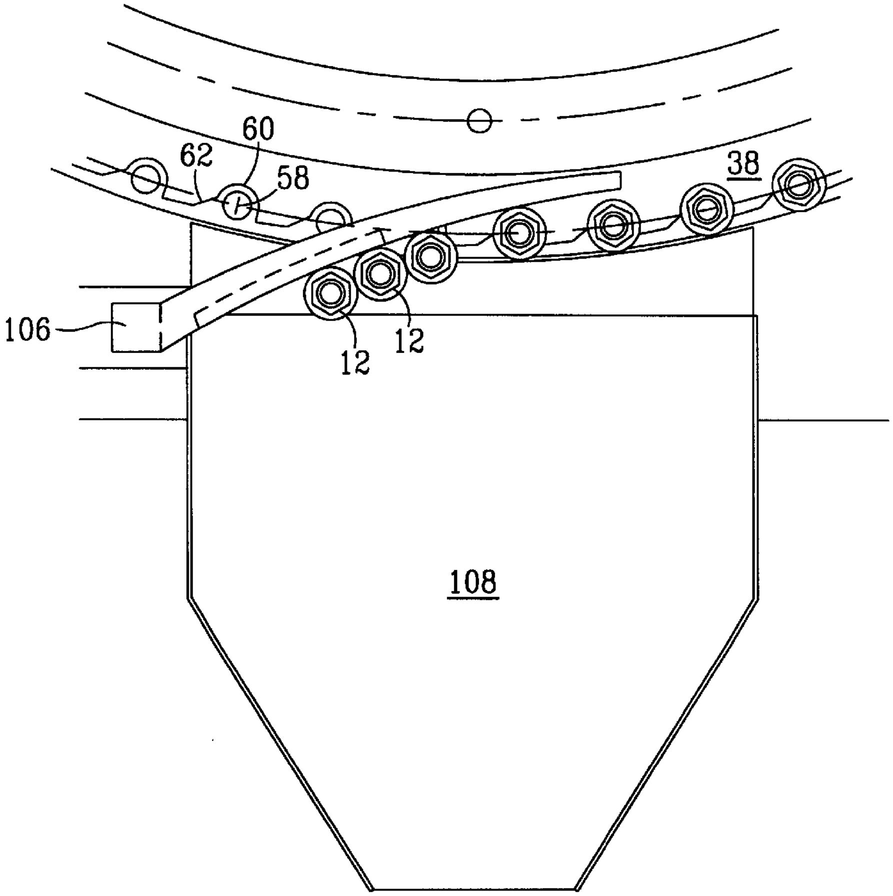
FIG. 15 is a top plan view of the escapement of the present invention illustrated in FIG. 14.
Figure 14:
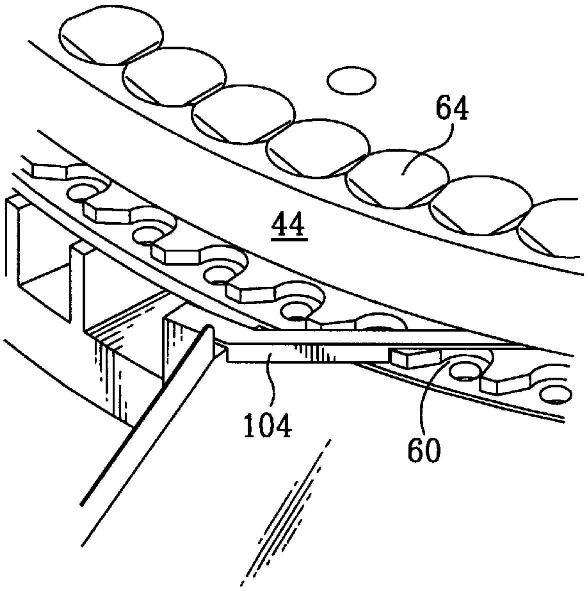
FIG. 14 is an enlarged side view of the parts removal station of the apparatus of the present invention.

As the dial 11 rotates past the purging station 18 only properly coated fasteners 12 remain in the pockets 60 of the plate 38. The rotation of the dial 11 next carries the coated fasteners 12 to the removal station 20. As illustrated in FIGS. 14 and 15 at the removal station, the upper portion of the fasteners 12 encounter an angled remover 106 which directs each fastener 12 out of its pocket 60 along its angled edge 62 and ultimately, off of the plate 38 and onto the ramp 108 for collection.

Figure 16:
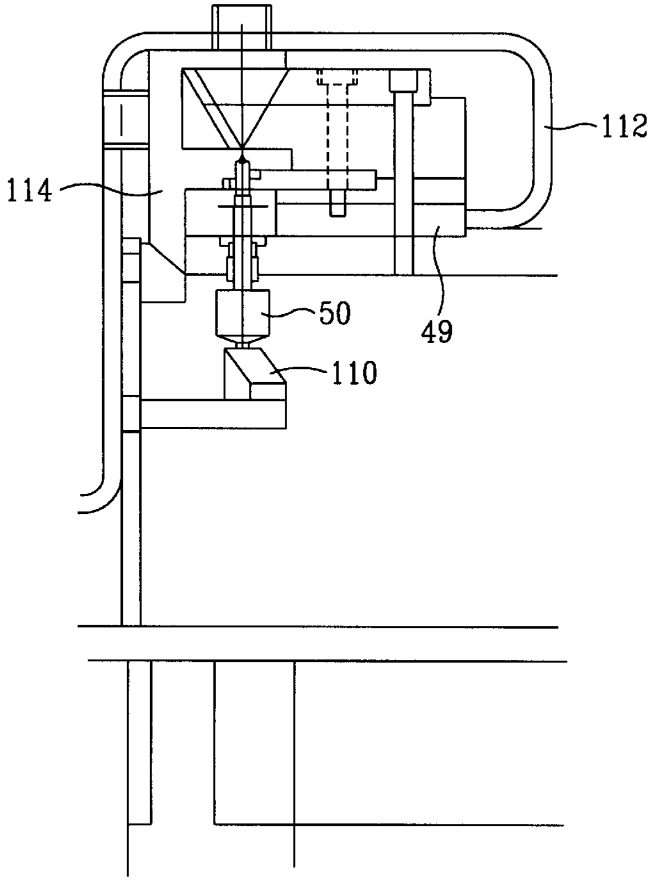
FIG. 16 is a partial cross-sectional view of the vacuum station of the apparatus of the present invention.
Figure 17:
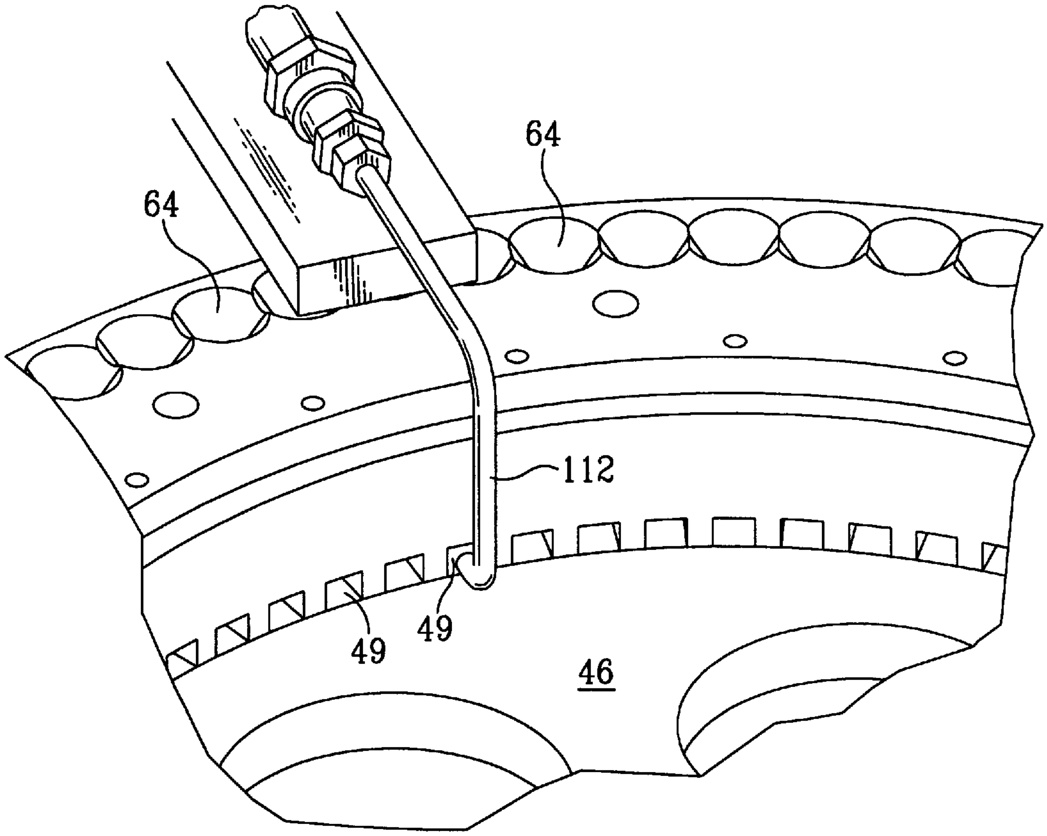
FIG. 17 is an enlarged side view of a portion of the vacuum station illustrated in FIG. 16.

As the dial continues to rotate an optional cleaning station 22 can next be provided. This station 22 can be provided at any position on the dial 11 after the fasteners 12 have been coated and ejected. With references to FIGS. 16 and 17, as the applicators 50 rotate into the cleaning station 22, their raised ends encounter a cam plate 110 similar in construction to the cam plate 82 as previously described. As the ends 80 engage the cam plate 110 of the applicators 50 are raised vertically into their fully extended position where they are exposed in vacuum 114 in a static location affixed to the machine base 17. In this manner, loose powder is removed from around the base of the pin 70 and its flange 76. Likewise, particles which may be electrostatically adhered to the cavities 64 are also removed in this manner. Optionally, an air jet 112 could be used in combination with the vacuum 114 to issue a pressurized blast of air through optional slots 49 in the base plate that correspond to the applicators 50. The cleaning station 22 permits the removal of excess coating material from the applicators 50 and the surrounding area without stopping or slowing the rotation of the dial from production speeds.

Figure 18:
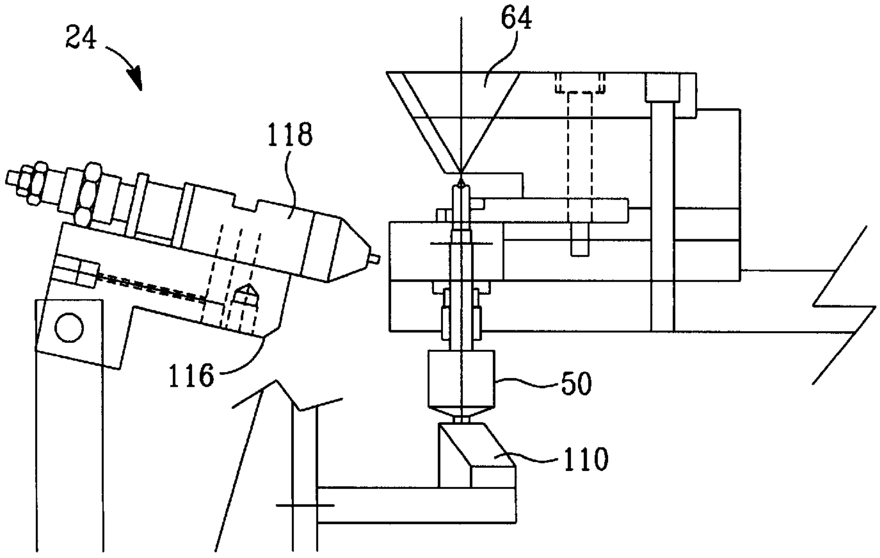
FIG. 18 is a partial cross-sectional side view of the lubrication station of the apparatus of the present invention.

Another optional station, a lubrication station 24 may also be provided along the dial 11. The lubrication station 24 is designed to minimize the rate of wear of the bushings 56 by providing an oiling device which places a small amount of lubricant precisely on the pin shaft 72 when the applicator 50 is in the on extended position. As illustrated in FIG. 18, preferred way of accomplishing this is through the use of an optical sensor 116 or timer which would determine when a pin shaft 72 is present and signal a liquid applicating gun 118 to supply the lubricant. In this manner, on the shafts 72 can be lubricated at any desired interval without either removing the applicators 50 or slowing or stopping the dial 11. After one complete revolution of the dial 11, the apparatus 10 is now ready to accept and process additional fasteners. In an alternative embodiment more than one fastener 12 could be applied to each pocket 60 processed and removed prior to the completion of one rotation of the dial 11.

Figure 19:
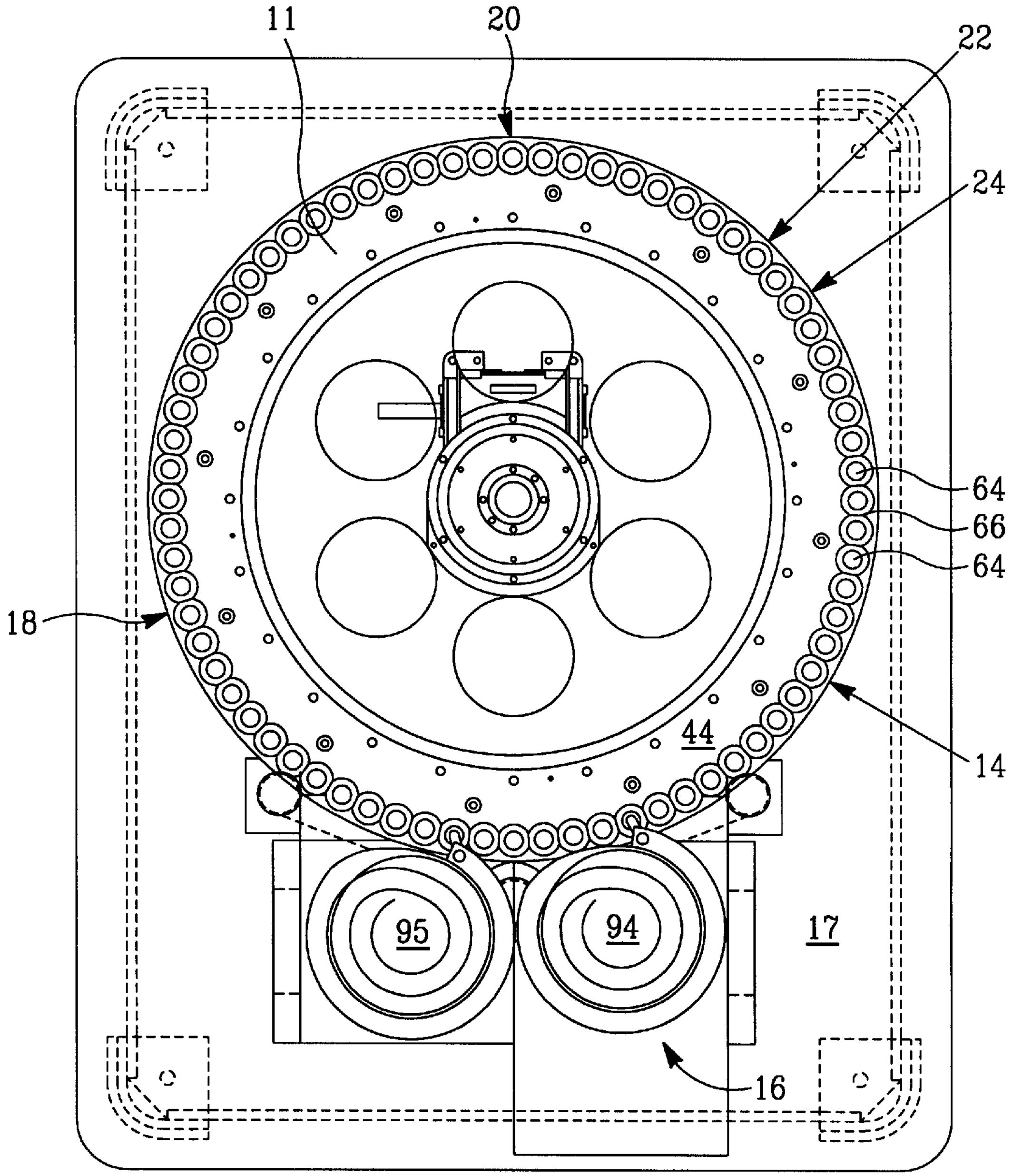
FIG. 19 is a diagrammatic top plan view of another embodiment of the apparatus of the present invention.

Referring now to FIG. 19, an alternative embodiment of the present invention is illustrated. The apparatus of this invention can be utilized to apply two or more coatings of powdered material onto each of a plurality of fasteners in a single rotation of the dial. One way of achieving this is to position two vibratory feeder systems 94 and 95 respectively, in close proximity around the dial. Such a configuration permits the application of a second coat of powdered material either immediately after application of the first coat of material, or at some preselected time thereafter. Although many systems could be utilized to achieve this end result, a particularly preferred embodiment is to utilize two vibratory powder feeders 94 and 95 spaced a distance from one another around the dial 11 as illustrated. This permits a second coat of powdered material to be applied on top of a first coat. The second coat could be of a powder material, either the same as or different from the first applied coat. This further permits application of a second powder coating having not only the same melting point as the first, but also either a lesser or higher melting point as well. Although the second vibratory powder feeder 95 is illustrated as being placed next to the first feeder 94, it should also be understood that it could easily be located on the opposite side of the dial 11 from the first feeder 94, which would permit the potential of bad parts ejection, or on line cleaning stations to be positioned between the time of application of the two coats of powdered material. The application of powdered material supplied by a second vibratory feeder 95 in this embodiment would be accomplished in the same manner as previously described with respect to the feeder 94.

The following example is given to aid in understanding the invention. It is to be understood that the invention is not limited to the particular procedures or parameters set forth in this example.

EXAMPLE 1

Internally threaded flange nuts (10 MM×1.5) were processed with 360° nylon patch coatings utilizing the present invention. A 30 kilowatt Ameritherm induction heater was utilized on the following settings:

Power setting—26.5

Amps—33

Volts—81

Frequency—213

The M-10 nuts were fed at the rate of 9,000 per hour to the nesting plate. The following pin speed settings were used:

Pin RPM—1775

Motor RPM—900

Belt speed—471 feet per minute

The fasteners were preheated and nylon coating material was applied to the heated threads thereof to form the 360° self-locking patch coating. Powder consumption was as follows:

Powder dispensed/hr.—336 grams

Powder dispensed per cone—0.037 grams (based on avg. of 12 samples)

Powder adhered to nut—0.033 grams (based on avg. of 12 samples)

Figure 20:
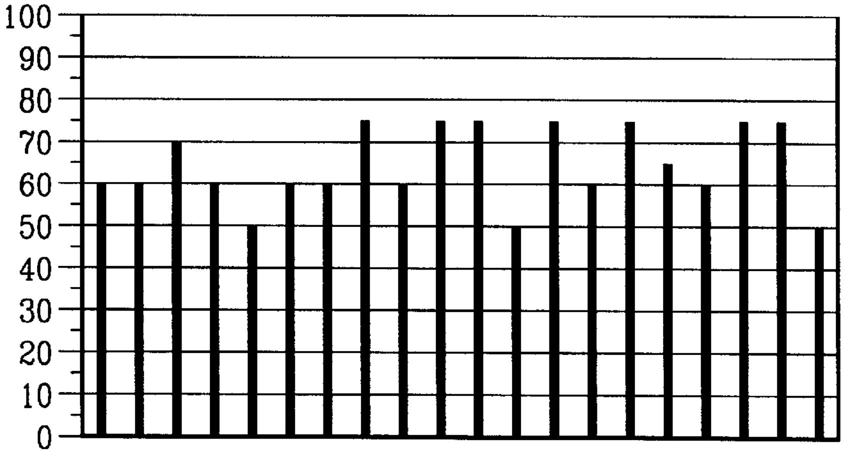
FIG. 20 is a graphical illustration of exemplary results achieved using the present invention.
Figure 20:
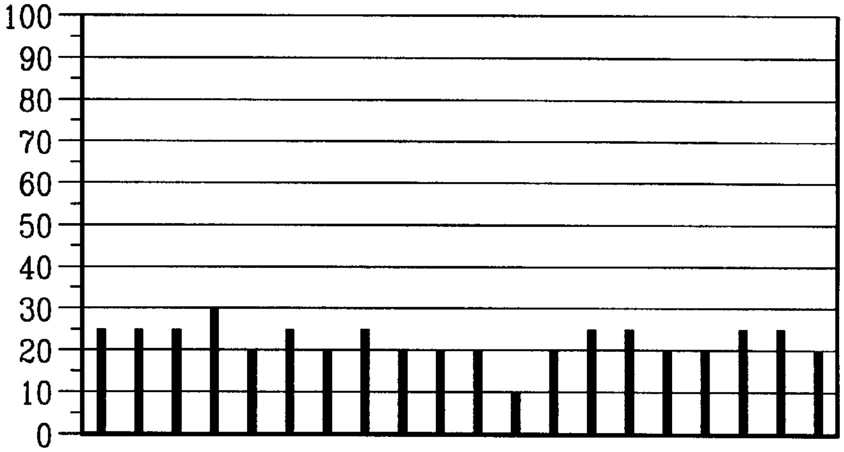

The fasteners processed exhibited a torque tension value as set forth in FIG. 20. The fasteners with the 360° nylon coatings applied thereto exhibited very consistent torque tension behavior and exceeded the requirements of the military specification MIL-F-18240F through twenty on and off cycles. In addition, the centrifugal application process of the present invention resulted in virtually all of the powder material dispensed to the internally threaded surface of the nut being adhered thereto, which was a much higher level than in prior known devices.

I claim:

1. An apparatus for applying a coating to articles having an internal bore comprising:

a moving support for conveying the articles;

a heating station positioned adjacent the moving support for heating said articles to within a predetermined temperature range as the articles move with the support; and an applicator positioned adjacent said moving support that applies a predetermined amount of powdered coating material simultaneously the entire 360° circumference of a select bore.

2. The apparatus of claim 1, further comprising a plurality of part holders that support and hold said articles substantially stationary as said articles are conveyed by said moving support.

3. The apparatus of claim 1, wherein each said part holders is substantially open on at least one of its sides.

4. The apparatus of claim 1, wherein said applicator is a centrifugal applicator.

5. The apparatus of claim 1, wherein said applicator has a faceted top surface that assists in directing the powdered coatingaterial towards the predetermined portion of the internal bore.

6. The apparatus of claim 1, wherein said applicator is movable vertically.

7. The apparatus of claim 1, wherein the top end of said applicator is positioned entirely within the internal bore within is applying coating material.

8. The apparatus of claim 1 further comprising:

means adjacent said moving support for detecting articles that have not had sufficient powdered coating material applied thereto; and means adjacent said moving support for removing articles that have not had sufficient powdered coating material applied thereto.

9. The apparatus of claim 1 further comprising means for removing excess powdered coating materials from said moving support in the area of said applicator, adjacent said moving support.

10. The apparatus of claim 1 further comprising means for lubricating said applicator adjacent said moving support.

11. The apparatus of claim 2, wherein each of said parts holders has an aperture over which an internal bore of a particle is centered.

12. The apparatus of claim 11 further comprising means for directing a stream of powdered material into the internal bore of said articles through the top of said bore.

13. The apparatus of claim 12, wherein said applicator is rotatable and movable vertically.

14. The apparatus of claim 13, wherein said applicator is positioned within the internal bore of an article with its top surface above the bottom of the article when it applies powdered coating material.

15. The apparatus of claim 1, wherein said heating station heats said articles to a temperature above the softening point of the powdered material.

16. The apparatus of claim 1, wherein said applicator applies two different coats of powdered coating material to said articles.

17. The apparatus of claim 1 further comprising means for selectively spinning said applicator during only a portion of the time that said articles are conveyed by said moving support.

18. The apparatus of claim 1 further comprising means for raising said applicators such that said tops of said applicators are located within said internal bore substantially immediately prior to the time that it applies powdered material to said bore.

19. The apparatus of claim 1 further comprising;

means for detecting and sending a signal upon start of said moving support; and means for removing a predetermined number of articles from said support in response to said signal from said detecting means.

20. An apparatus for applying 360° coatings of powdered coating material to a predetermined portion of an internal opening of a fastener, comprising:

a support for conveying said fasteners along a predetermined path;

a heating station for heating said fasteners above the softening point of the coating material; and means for simultaneously applying said coating material to the circumference of said predetermined portion of the internal surface of said fastener in an amount in excess of that required to form a coating, such that at least about 90% of the coating material applied remains adhered to said predetermined portion of said internal opening of said fastener.

21. An apparatus for applying powdered coating material on inner surfaces of an article with an internal bore, comprising:

a rotatable applicator having a diameter less than that of said internal bore; and at least one depression located on the top surface of said applicator to assist in directing the powdered coating material.

22. The apparatus of claim 21, further comprising means for selectively raising and lowering said applicator from a first position, wherein said top of said applicator is below the bottom surface of said applicator, to a second position where said top of said applicator is above said bottom of said applicator and below the top surface of said article.

* * * * *